Nov. 2, 1965 J. W. HALL 3,214,998
SYSTEM INCLUDING TWO OR MORE PRIME MOVERS FOR
DRIVING A COMMON LOAD
Filed Aug. 21, 1961 2 Sheets-Sheet 1

INVENTOR
JOHN W. HALL
BY
Watson, Cole, Grindle & Watson
ATTORNEYS

Nov. 2, 1965    J. W. HALL    3,214,998
SYSTEM INCLUDING TWO OR MORE PRIME MOVERS FOR
DRIVING A COMMON LOAD
Filed Aug. 21, 1961    2 Sheets-Sheet 2

INVENTOR
JOHN W. HALL

BY Watson, Cole, Grindle & Watson
ATTORNEYS

United States Patent Office 3,214,998
Patented Nov. 2, 1965

3,214,998
SYSTEM INCLUDING TWO OR MORE PRIME MOVERS FOR DRIVING A COMMON LOAD
John Wallace Hall, Southend-on-Sea, England, assignor, by mesne assignments, to Bristol Siddeley Engines, Limited, Bristol, England, a British company
Filed Aug. 21, 1961, Ser. No. 132,976
Claims priority, application Great Britain, Aug. 22, 1960, 29,014/60
4 Claims. (Cl. 74—661)

This invention relates to a system in which two or more prime movers can be coupled to a load, one of them through a clutch device whose mode of operation can be converted from a free wheel clutch mode to a disengaged clutch mode. The free wheel clutch mode will come into use when both prime movers are driving the load if the other prime mover drives faster than the said one prime mover and the disengaged clutch mode may be used if it is desired to use the one prime mover, not for driving the load, but for driving, say, auxiliary mechanism.

One example of such a system is an aircraft having two aircraft engines which can be used to drive a common drive shaft through appropriate gearing. Each engine is connected to the gearing through a free wheel clutch one of which can be made to operate as a disengaged clutch to enable the respective engine to drive auxiliary mechanism from another output shaft instead of driving the main output shaft. For taking off, climbing or landing, when both engines are needed for propulsion, the disengaged clutch can once again be made to operate as a free-wheel clutch.

One object of the present invention is to provide for such a system a lock for preventing the conversion of the mode of operation of the clutch device when the speeds of the input and output shafts are not suitable. For example, in the system briefly referred to above it might be disastrous if the transformation of mode was effected from disengaged clutch mode to free wheel clutch mode at a time when the free wheel clutch would be driving and the lock can be arranged to ensure that the transformation can only occur when the free wheel clutch would be free wheeling.

It has been proposed to control clutches by comparing the electrical outputs from signal generators connected to two engines. Such a system, however, suffers from several disadvantages. It is difficult to apply to more than one engine; the attendant amplifiers and equipment are complicated, bulky and heavy and, most serious of all, are unreliable at low rotational speeds since the signals are then very weak.

According to the present invention, a system including two or more prime movers for driving a common load, one of which drives through a clutch device whose mode of operation can be either as a free wheel clutch or a disengaged clutch, has a lock for preventing change of mode of operation of the clutch device, which lock is controlled by a fluid pressure generator responsive to the relationship between two speeds respectively dependent upon the speeds of the input and output members of the clutch device. Conveniently, the other prime mover is arranged to drive a common load through a conventional free-wheel clutch. There may be means for ensuring that the speed of the input member of the clutch device differs from the speed of the output member by at least a specified amount before the lock can be released to allow a change in the mode of operation of the clutch device.

In one form of the invention, the system includes two members responsive to the speeds of the input and output shafts respectively of the clutch device, each of the two members comprising one of two positive displacement fluid pumps arranged in series in a fluid circuit, and the lock being arranged to engage if the pressure in the circuit builds up due to one of the pumps having a faster pumping rate than the other. In this form of the invention the speed margin could be provided by giving one of the pumps a slightly greater pumping rate at a given speed than the other.

In another form of the invention the two speed responsive devices comprise respective members of a differential gear having a differential member which is rotated at a speed and in a sense dependent upon the relationship of one speed to the other. In this form the speed margin could be provided by using a speed changing gear in one of the connections to the differential gear or by use of a slipping drive, for example one including an electromagnetic or fluid coupling.

In an application where there are more than two prime movers for driving a common load, each of those prime movers not connected through the clutch device can be connected to one of the speed responsive members through a free-wheel clutch so that which ever of these prime movers is the faster will determine whether the lock can be released or not.

The invention may be carried into practice in various ways and several embodiments will now be described by way of example with reference to the accompanying drawings in which.

Figure 1:
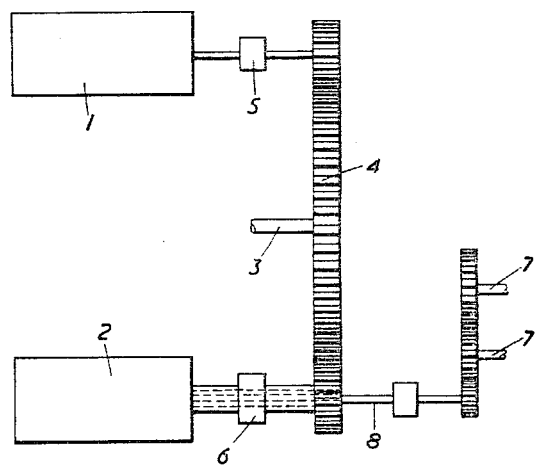
FIGURE 1 shows a typical power plant arrangement to which the invention can be applied.

The power plant arrangement shown in FIGURE 1 is part of an aircraft and comprises two gas turbine engines 1 and 2 which drive a common main drive shaft 3 through appropriate gearing 4. The engine 1 is connected to the gearing 4 through an ordinary free wheel clutch device 5 while the engine 2 is connected to the gearing through a free wheel clutch 6 which can be wholly disengaged to enable the engine 2 to drive auxiliary mechanism through shafts 7 by means of a shaft 8 passing axially through the centre of the shaft in which the clutch device 6 is incorporated. The disengageable free wheel clutch device 6 may take various forms and may, for example, comprise a series of balls or rollers held in a cage which can be moved axially out of engagement with either the driven or the driving shaft when it is desired to totally disengage the clutch. Another suitable form of disengageable free wheel clutch is that described in Barlow co-pending U.S. patent application Serial No. 99,592, filed March 30, 1961, now Patent No. 3,099,339.

Figure 2:
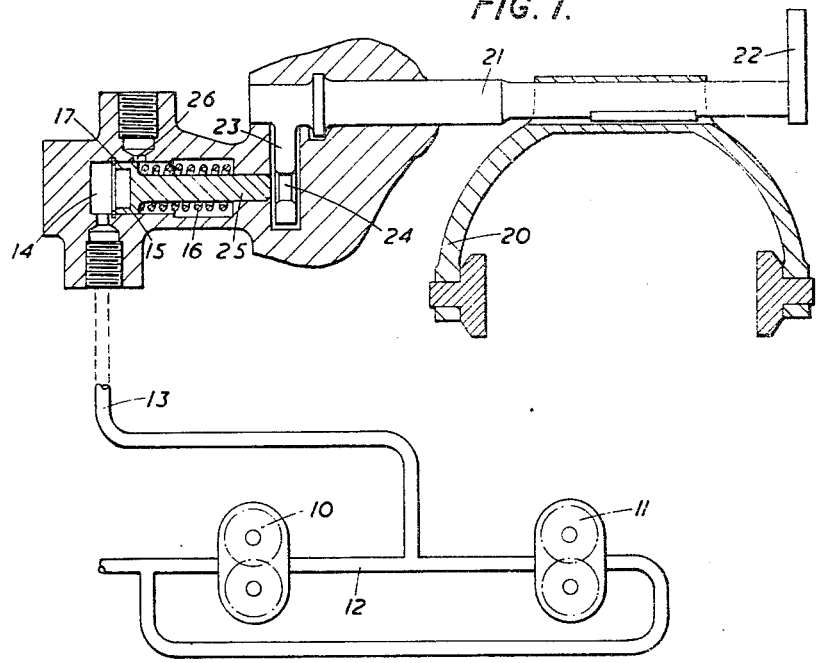
FIGURE 2 is a diagram showing one way in which the invention can be carried out in an arrangement having two engines.

In applying the invention to the arrangement shown in FIGURE 1, the apparatus shown in FIGURE 2 may be employed. The input shaft to the clutch device 6 from the turbine 2 is arranged to drive a gear pump 10 while the output shaft of the clutch device 6 to the gearing 4 is arranged to drive a second gear pump 11 through drives which will produce equal speeds of rotation of the gear pumps 10 and 11 when the input and output shafts of the clutch device 6 are rotating at the same speeds. The pump 10 has a slightly greater pumping rate for a given speed than the pump 11. These pumps are connected in a series hydraulic circuit 12 and off the passage connecting the pumps 10 and 11 there is a branch passage 13 leading to a cylinder 14 containing a piston 15 which is biased to the left as viewed in FIGURE 2 by a spring 16. Movement of the piston 15 to the left is restricted by means of a circlip 17 which prevents the piston 15 closing the port leading from the branch passage 13. Axial movement of the cage containing the balls or rollers of the clutch device 6 is produced by means of a fork 20 which is secured for rotation on a shaft 21, the rotational position of which is controlled by a control lever 22 which is either under the control of the pilot or an automatic device. The end of the shaft 21 remote from the lever 22 carries a second lever 23 in which there is an opening 24 which is radially spaced from the axis of the shaft 21 by the same distance as is the axis of the piston 15. The piston 15 carries a piston rod 25 which can extend through an aperture in the end of the cylinder 14 and enter the opening 24 in the lever 23 on the shaft 21. The piston rod 25 constitutes a lock for the clutch device 6. The cylinder 14 is provided with a spill port 26.

Operation of the apparatus is as follows. Except when the pump 11 is operated at a speed which is greater than the speed of the pump 10 by at least a predetermined amount (which depends upon the difference in capacity between the pumps 10 and 11) a pressure will be built up in the branch passage 13 which will cause the piston 15 to move to the right as viewed in the drawing, until the piston uncovers the spill port 26. This action will cause the piston rod 25 to enter the opening 24 in the lever 23 thus locking the disengageable clutch and preventing its condition from being changed by the control lever 22. On the other hand if the rate of pumping of the pump 10 falls then pressure in the branch passage 13 will be relieved and the piston rod 25 will be disengaged from the opening 24 and the mode of operation of the clutch device 6 can be freely changed.

Figure 3:
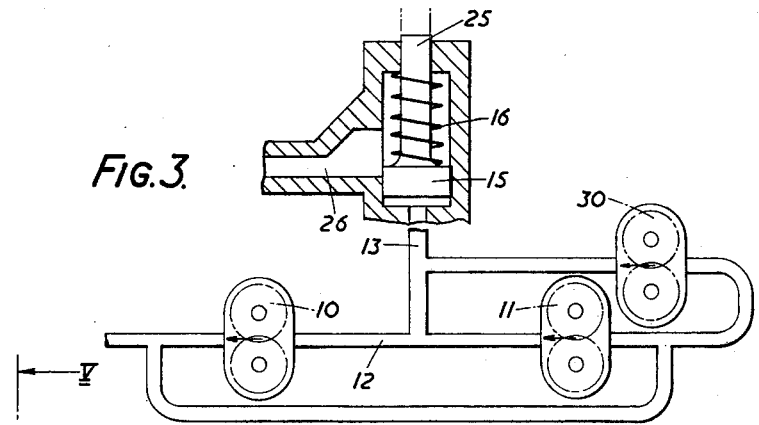
FIGURE 3 is a diagram similar to FIGURE 2 showing the way in which the invention can be applied to an arrangement having three engines.

FIGURE 3 shows an arrangement somewhat similar to FIGURE 2 but the piston and cylinder arrangement are only shown diagrammatically. In this arrangement the pump 10 is operated by the input shaft of the disengageable clutch device 6 and the pump 11 is driven directly by one of two other prime movers, the other of which drives a similar gear pump 30 arranged in parallel with the gear pump 11. For the general case where there are $n+1$ prime movers, the gear pumps other than the gear pump driven by the engine associated with the disengageable clutch device should each have about $1/n$ of the pumping rate of the gear pump associated with the disengageable clutch device. Thus, provided the sum of the pumping rates of the pumps other than that associated with the disengageable clutch device is equal to or greater than the pumping rate of the pump associated with the disengageable clutch device, the piston rod 25 will not be engaged in the opening 24.

Figure 4:
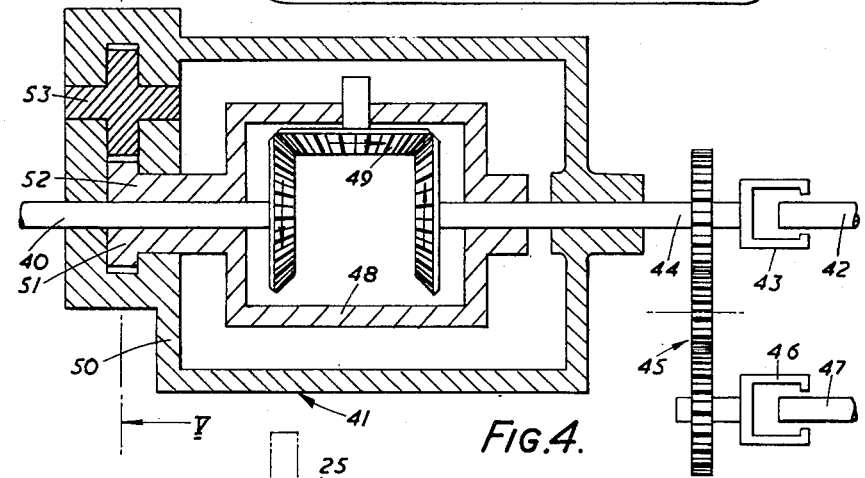
FIGURE 4 is a diagram showing an alternative way in which the invention can be applied to an arrangement having three engines.
Figure 5:
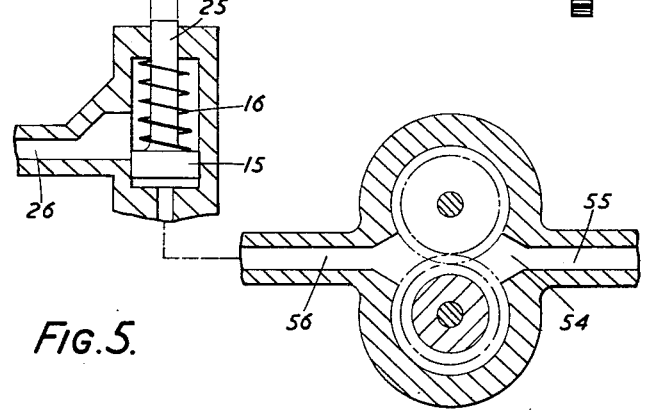
FIGURE 5 is a section on the line V—V of FIGURE 4.

In the arrangement shown in FIGURE 4 the engine associated with the disengageable clutch device 6 drives one input shaft 40 of a differential gear 41. One other engine of the power plant arrangement drives a shaft 42 which is coupled through a free wheel 43 with the other input shaft 44 of the differential 41. The input shaft 44 can also be driven through gearing 45 and a free wheel 46 by a shaft 47 which is driven by another engine of the power plant arrangement. The differential 41 includes a cage 48 in which a bevel gear 49 is rotatably mounted and which itself is rotatably mounted in the casing 50 of the differential. The shaft 51 of the cage 48 is provided with a gear 52 which engages with a gear 53, the gears 52 and 53 being mounted in a chamber 54 in the housing 50 of the differential and forming a gear pump having an inlet 55 and a discharge passage 56. The discharge passage 56 corresponds to the passage 13 of FIGURES 2 and 3 and leads to a similar cylinder and piston arrangement the piston of which controls a lock for the disengageable clutch device 6.

When the rotational speeds of the shafts 40 and 44 are equal the cage 48 will be stationary but if the rotational speeds of the shafts 40 and 44 differ then the cage 48 will rotate at a speed equal to half the difference in speeds between the shafts 40 and 44. When the shaft 40 rotates at a greater speed than the shaft 44 the gear pump formed by the gears 52 and 53 will increase the pressure in the discharge passage 56 and cause the lock to be engaged.

What I claim as my invention and desire to secure by Letters Patent is:

1. A system including three prime movers, a common load and a transmission from each prime mover to the load, a disengageable free-wheel clutch in one of the transmissions, an operating member for engaging and disengaging the clutch, external means for moving the operating member, a lock for preventing movement of the operating member to engage the clutch, a positive displacement fluid pump driven by each of the prime movers, a fluid circuit containing the fluid pump driven by the prime mover whose transmission includes the free-wheel clutch on the one hand, in series with the other fluid pumps in parallel on the other hand, and an operative connection between the fluid circuit and the lock to cause the lock to engage if the fluid pressure in the circuit builds up due to the one pump pumping at a faster rate than the sum of the rates of the other pumps.

2. A system including two prime movers, a common load and a transmission between each prime mover and the load, one of which transmissions includes a disengageable free-wheel clutch, an operating member for engaging and disengaging the clutch, external means for moving the operating member, a lock for preventing movement of the operating member to engage the clutch, two positive displacement fluid pumps each driven by one of the prime movers, a fluid circuit containing the two fluid pumps in series and an operative connection between the fluid circuit and the lock for causing the lock to engage if the fluid pressure in the circuit builds up due to the pump driven by the prime mover whose transmission includes the free-wheel clutch pumping at a faster rate than the other pump.

3. A system as claimed in claim 2 in which the pump driven by the prime mover whose transmission includes the free-wheel clutch has a slightly greater pumping rate than the pump driven by the other prime mover for the same pump speed.

4. A system as claimed in claim 3 in which the operative connection between the fluid circuit and the lock comprises a piston and cylinder arrangement, the cylinder of which is in communication with the fluid circuit, while the piston is associated with the lock.

References Cited by the Examiner
UNITED STATES PATENTS

| | | | |
|---|---|---|---|
| 1,456,008 | 5/23 | Nuanes | 74—661 |
| 2,306,418 | 12/42 | Wilson | 74—477 |
| 2,971,402 | 2/61 | Lovercheck | 74—661 |

FOREIGN PATENTS

| | | |
|---|---|---|
| 619,028 | 4/61 | Canada. |
| 1,076,451 | 2/60 | Germany. |

BROUGHTON G. DURHAM, *Primary Examiner.*